US008230085B2

(12) United States Patent
Roa

(10) Patent No.: US 8,230,085 B2
(45) Date of Patent: *Jul. 24, 2012

(54) SYSTEM AND METHOD FOR SUPPORTING BLOCK-BASED PROTOCOLS ON A VIRTUAL STORAGE APPLIANCE EXECUTING WITHIN A PHYSICAL STORAGE APPLIANCE

(75) Inventor: Guillermo Roa, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 1566 days.

This patent is subject to a terminal disclaimer.

(21) Appl. No.: 10/822,431

(22) Filed: Apr. 12, 2004

(65) Prior Publication Data

US 2005/0228835 A1    Oct. 13, 2005

(51) Int. Cl.
*G06F 15/16* (2006.01)
*G06F 21/00* (2006.01)
(52) U.S. Cl. ............. 709/229; 709/245; 709/246; 711/6
(58) Field of Classification Search ................... 709/229, 709/245–246; 711/6
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,432,907 A | 7/1995 | Picazo, Jr. et al. | |
| 5,485,579 A | 1/1996 | Hitz et al. | |
| 5,488,716 A | 1/1996 | Schneider et al. | |
| 5,513,314 A | 4/1996 | Kandasamy et al. | |
| 5,754,829 A | 5/1998 | Motohiro et al. | |
| 5,761,421 A * | 6/1998 | van Hoff et al. | 709/223 |
| 5,802,366 A | 9/1998 | Row et al. | |
| 5,819,292 A | 10/1998 | Hitz et al. | |
| 5,835,720 A | 11/1998 | Nelson et al. | |
| 5,931,918 A | 8/1999 | Row et al. | |
| 5,941,972 A | 8/1999 | Hoese et al. | |
| 5,963,962 A | 10/1999 | Hitz et al. | |

(Continued)

FOREIGN PATENT DOCUMENTS

EP    0785500 A1    7/1997

(Continued)

OTHER PUBLICATIONS

Maintenance Procedures ND (8C) nd-network disk control Feb. 1985.

(Continued)

*Primary Examiner* — George C Neurauter
(74) *Attorney, Agent, or Firm* — Cesari and McKenna, LLP

(57) ABSTRACT

An architecture provides the ability to create and maintain multiple instances of virtual servers, such as virtual filers (vfilers), within a server, such as a storage appliance. A vfiler is a logical partitioning of network and storage resources of the storage appliance platform to establish an instance of a multi-protocol server. Each vfiler is allocated a subset of dedicated units of storage resources, such as volumes or logical sub-volumes (qtrees), and one or more network address resources. Each vfiler is also allowed shared access to a file system resource of a storage operating system. To ensure controlled access to the allocated and shared resources, each vfiler is further assigned its own security domain for each access protocol. A vfiler boundary check is performed by the file system to verify that a current vfiler is allowed to access certain storage resources for a requested file stored on the filer platform.

18 Claims, 10 Drawing Sheets

U.S. PATENT DOCUMENTS

| | | | |
|---|---|---|---|
| 6,038,570 | A | 3/2000 | Hitz et al. |
| 6,058,423 | A | 5/2000 | Factor |
| 6,065,037 | A | 5/2000 | Hitz et al. |
| 6,167,446 | A | 12/2000 | Lister et al. |
| 6,230,200 | B1 | 5/2001 | Forecast et al. |
| 6,260,068 | B1 * | 7/2001 | Zalewski et al. ............. 709/226 |
| 6,351,775 | B1 | 2/2002 | Yu |
| 6,425,035 | B2 | 7/2002 | Hoese et al. |
| 6,457,130 | B2 | 9/2002 | Hitz et al. |
| 6,604,123 | B1 | 8/2003 | Bruno et al. |
| 6,606,690 | B2 * | 8/2003 | Padovano ..................... 711/148 |
| 6,633,916 | B2 * | 10/2003 | Kauffman .................... 709/229 |
| 6,647,422 | B2 | 11/2003 | Wesinger et al. |
| 6,789,152 | B2 * | 9/2004 | Hoese et al. ................. 710/305 |
| 6,802,062 | B1 | 10/2004 | Oyamada et al. |
| 6,813,766 | B2 | 11/2004 | Hay |
| 6,816,905 | B1 | 11/2004 | Sheets et al. |
| 6,854,114 | B1 | 2/2005 | Sexton et al. |
| 6,865,601 | B1 | 3/2005 | Cherkasova et al. |
| 6,868,417 | B2 * | 3/2005 | Kazar et al. ..................... 707/10 |
| 6,880,060 | B2 * | 4/2005 | Talagala et al. ............... 711/170 |
| 6,895,429 | B2 | 5/2005 | Banga et al. |
| 6,944,699 | B1 | 9/2005 | Bugnion et al. |
| 6,944,733 | B2 * | 9/2005 | Zamer .......................... 711/162 |
| 6,944,785 | B2 | 9/2005 | Gadir et al. |
| 6,961,806 | B1 | 11/2005 | Agesen et al. |
| 6,993,539 | B2 | 1/2006 | Federwisch et al. |
| 7,010,663 | B2 * | 3/2006 | George et al. ................. 711/209 |
| 7,020,805 | B2 * | 3/2006 | Talagala et al. ................. 714/42 |
| 7,047,301 | B2 | 5/2006 | Skene et al. |
| 7,055,014 | B1 | 5/2006 | Pawloski et al. |
| 7,069,307 | B1 * | 6/2006 | Lee et al. ..................... 709/217 |
| 7,107,385 | B2 | 9/2006 | Rajan et al. |
| 7,111,137 | B2 * | 9/2006 | Chong, Jr. ..................... 711/162 |
| 7,114,014 | B2 * | 9/2006 | Yatziv et al. ..................... 710/1 |
| 7,133,883 | B2 * | 11/2006 | Talagala et al. ............... 707/202 |
| 7,243,089 | B2 * | 7/2007 | Becker-Szendy et al. ........ 707/1 |
| 7,360,034 | B1 * | 4/2008 | Muhlestein et al. .......... 711/148 |
| 7,523,201 | B2 | 4/2009 | Lee et al. |
| 7,555,772 | B2 * | 6/2009 | Shu et al. ........................ 726/11 |
| 7,657,898 | B2 * | 2/2010 | Sadiq ............................. 719/330 |
| 7,685,281 | B1 * | 3/2010 | Saraiya et al. ................ 709/226 |
| 2002/0016812 | A1 * | 2/2002 | Uchishiba et al. ............ 709/104 |
| 2002/0175938 | A1 | 11/2002 | Hackworth |
| 2003/0037092 | A1 * | 2/2003 | McCarthy et al. ............ 709/104 |
| 2003/0195942 | A1 | 10/2003 | Muhlestein et al. |
| 2004/0010562 | A1 * | 1/2004 | Itonaga .......................... 709/213 |
| 2004/0030668 | A1 | 2/2004 | Pawlowski et al. |
| 2004/0233910 | A1 * | 11/2004 | Chen et al. .................. 370/395.5 |
| 2004/0260670 | A1 * | 12/2004 | Tokimitsu et al. ................ 707/1 |
| 2005/0050107 | A1 * | 3/2005 | Mane et al. ................... 707/200 |
| 2005/0149548 | A1 * | 7/2005 | Chong, Jr. ..................... 707/102 |
| 2005/0149554 | A1 * | 7/2005 | Chong, Jr. ................. 707/103 R |
| 2005/0210150 | A1 * | 9/2005 | Bahl ............................. 709/245 |
| 2008/0307425 | A1 * | 12/2008 | Tripathi ........................ 718/104 |

FOREIGN PATENT DOCUMENTS

| | | |
|---|---|---|
| EP | 1100001 A2 | 5/2001 |
| EP | 1 326 408 A2 | 7/2003 |

OTHER PUBLICATIONS

Misc. Reference Manual Pages ND (4P) nd-network disk driver Jul. 26, 1985.
Asante EN/SC Adapter Family Installation Guide May 1994.
Asante Desktop EN/SC Adapters User's Manual Apr. 1996.
Performance Without Compromise: The Virtual Storage Architecture 1997.
Anthony J. McGregor Department of Computer Science, University of Waikato Dissertation: Block-Based distributed File Systems Jul. 1997.
Brouwers, Marja, Partial Internation Search Report for International Application No. PCT/US2005/012175.
"Design of a Virtual Server for Service Interworking over Heterogeneous Networks", Nam et al., Electron & Telecommun. Res. Inst., Teajon, South Korea, Aug. 20-22, 1997, pp. 406-409.
Eckstein, R. et al. "Using Samba", Nov. 1999, O'Reilly & Associates.
Glaude, David. "Virtual Server with Separate/Multiple Default Gateway/Routing", Mailing List LARTC Online, Nov. 9, 2001, pp. 1-3, XP-002256475.
IEEE_SA Standards Board, "Virtual Bridged Local Area Networks", IEEE Std 802,1Q-1998, Mar. 8, 1999, pp. 1-199.
Rekhter, Y., Network Working Group, Request for Comments 1918, entitled "Address Allocation for Private Internets," Feb. 1996, pp. 1-9.
European Search Report for European Patent Application No. EP 02 25 8871.9, Filed Dec. 23, 2002, all pages.
z/Vm General Information: Version 3 Release 1.0, Second Edition, Jan. 2001, International Business Machines Corporation.
Celerra File Server Architecture for High Availability, Aug. 1999, EMC Corporation, NY.
EMC Celerra File Server: Product Description Guide, Jun. 2000, EMC Corporation, NY.
Allison, Jeremy, "Doing the NIS/NT Samba", LinuxWorld.com, Oct. 1, 1998, pp. 1-9.
European Search Report, Application No. EP 02 25 8949, Reference No. EPP87333, Mar. 9, 2007.
Dougal, Richard MC et al., "Resource Management", 1999, Prentice Hall, USA, ISBN: 0-13-025855-5, pp. iii-xxvii, Chapter 1, Chapter 2, Chapter 6, Chapter 7, Chapter 11, back cover.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
Kamp, Paul-Henning et al. "Jails: Confining the Omnipotent Root", $2^{nd}$ International SANE Conference, Maastrich, The Netherlands, May 22-25, 2000.
Jail(2) MAN Page from the FreeBSD 4.0 Operating System, Apr. 28, 1999, available at http://www.freebsd.org/cgi/man.cgi.
Jail(8) MAN Page from the FreeBSD 4.0 Operating System, Apr. 28, 1999, available at http://www.freebsd.org/cgi/man.cgi.
Jail(8) MAN Page from the FreeBSD 4.1 Operating System, Apr. 12, 2001, available at http://www.freebsd.org/cgi/man.cgi.
Chroot(2) MAN Page from the FreeBSD 4.0 Operating System, Apr. 12, 2001, available at http://www.freebsd.org/cgi/man.cgi. Indicated from earlier BSD 4.2 distribution.
Chroot(8) MAN Page from the FreeBSD 4.0 Operating System, Apr. 12, 2001, available at http://www.freebsd.org/cgi/man.cgi. Indicated from earlier BSD 4.2 distribution.
Bressard, Thomas. "TFT: A Software System for Application-Transparent Fault Tolerance," Symposium on Fault-tolerant Computing, Munich, Germany, Jun. 23-25, 1998, pp. 128-137.
Gribble, Steven D. et al, "Denali: Lightweight Virtual Machines for Distributed and Networked Systems," Aug. 7, 2001, HP Labs, Sprint Labs Available at http://denali.cs.washington.edu/pubs/index.html.
Rosenblum, Mendel et al., "Using the SimOS Machine Simulator to Study Complex Computers Systems," ACM Trans on Modeling and Computer Simulation, vol. 7, No. 1, Jan. 1997.
Seawright, L.H. et al, "VM/370- A Study of Multiplicity and Usefulness," IBM Systems Journal, vol. 18, No. 1, 1979.
Creazy, R.J., "The Origin of the VM/370 Time-Sharing System," IBM Journal of Research and Development, vol. 2, No. 5, Sep. 1981.
Hitz, David et al. TR3002 File System Design for a NFS File Server Appliance published by Network Appliance, Inc., 1994.
Satran et al., *Internet Draft: iSCSI*, Aug. 5, 2002.

* cited by examiner

| VOLUME NAME | 805 |
| --- | --- |
| PATHNAME | 810 |
| VOLUME NUMBER | 815 |
| APPLIANCE NAME | 820 |
| APPLIANCE NUMBER | 825 |
| PCPI NUMBER | 830 |
| WWNS TO BE EXPORTED TO | 835 |
| VFILER | 840 |
| ⋮ | 845 |

FIG. 8

SYSTEM AND METHOD FOR SUPPORTING BLOCK-BASED PROTOCOLS ON A VIRTUAL STORAGE APPLIANCE EXECUTING WITHIN A PHYSICAL STORAGE APPLIANCE

RELATED APPLICATION

This application is related to U.S. patent application Ser. No. 10/035,664, entitled ARCHITECTURE FOR CREATING AND MAINTAINING VIRTUAL FILERS ON A FILER, by Mark Muhlestein, et al, the contents of which are hereby incorporated by reference.

FIELD OF THE INVENTION

The present invention relates to server architectures and, more specifically, to an architecture that enables instantiation of multiple logical servers that support block-based protocols within a single physical server platform.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including a storage operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level access to files and file systems. Storage of information on a NAS system is typically deployed over a computer network comprising a geographically distributed collection of interconnected communication links, such as Ethernet, that allow clients to remotely access the information (files) stored on the file server. The clients typically communicate with the filer by exchanging discrete frames or packets of data according to pre-defined protocols, such as the well-known Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the well-known Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

Conversely, a SAN is a high-speed network that enables establishment of direct connections between a storage system and its storage devices. The SAN may thus be viewed as an extension to a storage bus and, as such, a storage operating system of the storage system enables access to stored information using block-based access protocols over the "extended bus." In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server.

A storage system typically includes a large amount of storage (e.g., 6 terabytes) with the ability to support many (thousands) of users. This type of storage system is generally too large and expensive for many applications or "purposes." Even a typical minimum storage size of a volume (or file system) is approximately 150 gigabytes (GB), which is still generally too large for most purposes. Rather than utilizing a single typical storage system, a user may purchase a plurality of smaller servers, wherein each server is directed to accommodating a particular purpose of the user. However, there is still the granularity of storage issue since, as noted, the typical minimum storage size of a volume is approximately 150 GB. In addition, the acquisition of many smaller servers may be more costly than the purchase of a single storage system. Furthermore, the cost of maintenance and administration of many smaller servers is typically substantially more than the cost of maintaining and administering a single storage system. Therefore, it would be desirable to consolidate many servers within a single filer platform in a manner that logically embodies those servers. Server consolidation is thus defined as the ability to provide multiple logical or virtual servers within a single physical server platform. Examples of virtual servers that may be embodied within a single platform are web servers, database servers, mail servers and name servers.

Previous techniques for server consolidation permitted a plurality of virtual instantiations of a server to execute on a single physical server platform. However, such instantiations were limited to file-based protocols, such as the Network File System (NFS) or the Common Internet File System (CIFS). Such consolidated servers were not capable of processing SAN-based data access requests utilizing block-based protocols, such as FCP or iSCSI. As a result, administrators desiring to utilize server or consolidated servers were limited to NAS-based networks utilizing file-level protocols. However, administrators desiring to utilize block-based protocols were required to acquire separate servers or a plurality of physical servers to meet their data access needs. This requirement is often uneconomical due to the large minimum storage size of a volume. As such, administrators establishing SAN-based systems often utilize only a small portion of the minimum required storage space, thereby "wasting" a large percentage of the purchased storage capacity.

SUMMARY OF THE INVENTION

The present invention relates to an architecture that provides the ability to create and maintain multiple instances of virtual servers, such as virtual filers (vfilers), within a storage system that supports block-based protocols. A vfiler is a logical partitioning of network and storage resources that are adapted to process one or more block-based protocols. The network and storage resources are partitioned to establish an instance of a multi-protocol server that is configured to service data access requests in response to the block-based protocols. Each vfiler is maintained and executed independent of other vfilers on the physical storage system platform. Dedicated storage system resources, such as units of storage and network addresses of network interfaces, may be grouped and partitioned to establish security domains within the storage system. Yet common storage system resources, such as a storage operating system and a file system, may be shared among the vfilers.

Specifically, each vfiler is allocated dedicated and distinct units of storage resources, such as volumes or qtrees, and network addresses, such as IP addresses or FC world wide names (WWNs). Each vfiler is also allowed shared access to the common file system on behalf of its client systems. Each vfiler is provided a vfiler context data structure including, among other things, information pertaining to a unique and distinct security domain of the vfiler (for each supported access protocol) to thereby enable controlled access to allocated and shared resources of the vfiler.

Lun-based commands associated with an user interface (UI) of the storage operating system executing on the physical storage system are modified to operate within a particular vfiler context. Additionally, each lun data structure within a vfiler is tagged with appropriate vfiler ownership information to enable exporting of luns associated with the vfiler. Similarly, initiator group (igroup) data structures are identified with a particular vfiler context so that an administrator of a particular vfiler may only manage igroups associated with that context.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 8 is a schematic block diagram of an exemplary lun data structure in accordance with an embodiment of the present invention;

DETAILED DESCRIPTION OF AN ILLUSTRATIVE EMBODIMENT

A. Physical Storage Appliance

Figure 1:
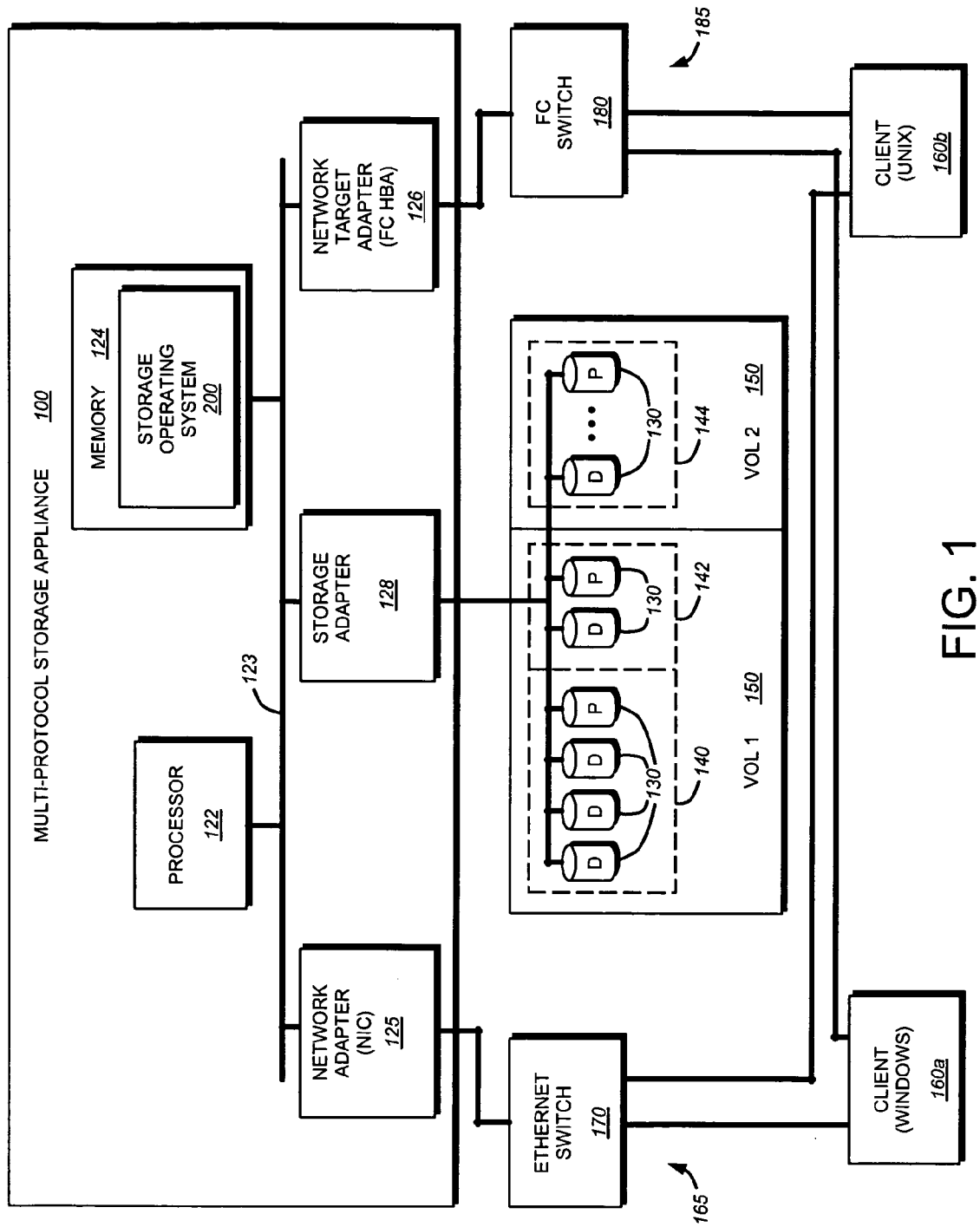
FIG. 1 is a schematic block diagram of an exemplary storage system in accordance with the embodiment of the present invention.

FIG. 1 is a schematic block diagram of a physical storage system 100 configured to provide storage service relating to the organization of information on storage devices, such as disks 130. The storage system 100 is illustratively embodied as a multi-protocol storage appliance comprising a processor 122, a memory 124, a plurality of network adapters 125, 126 and a storage adapter 128 interconnected by a system bus 123. A multi-protocol appliance denotes a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (lun) emulation. The storage system 100 also includes a storage operating system 200 that provides a virtualization system (and, in particular, a file system) to logically organize the information as a hierarchical structure of named directory, file and virtual disk (vdisk) storage objects on the disks 130.

Whereas clients of a NAS-based network environment have a storage viewpoint of files, the clients of a SAN-based network environment have a storage viewpoint of blocks or disks. To that end, the storage appliance 100 presents (exports) disks to SAN clients through the creation of luns or vdisk objects. A vdisk object (hereinafter "vdisk") is a special file type that is implemented by the virtualization system and translated into an emulated disk as viewed by the SAN clients.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance.

The network adapter 125 couples the storage appliance to a plurality of clients 160a,b over point-to-point links, wide area networks, virtual private networks implemented over a public network (Internet) or a shared local area network, hereinafter referred to as an illustrative Ethernet network 165. Therefore, the network adapter 125 may comprise a network interface card (NIC) having the mechanical, electrical and signaling circuitry needed to connect the appliance to a network switch, such as a conventional Ethernet switch 170. For this NAS-based network environment, the clients are configured to access information stored on the multi-protocol storage appliance as files. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160*a* running the Windows operating system may communicate with the storage appliance 100 using the Common Internet File System (CIFS) protocol over TCP/IP. On the other hand, a client 160*b* running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload fiber channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The storage appliance 100 supports various block-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 165, 185 to access information stored on the disks. When the underlying transport protocol is TCP/IP, clients may encapsulate SCSI protocol commands over TCP/IP to generate iSCSI commands. The iSCSI protocol is further defined in *Internet Draft: iSCSI*, Aug. 5, 2002, by Julian Satran et al., the contents of which are hereby incorporated by reference.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed. However, a typical implementation may include three data and one parity disk per RAID group and at least one RAID group per volume.

To facilitate access to the disks 130, the storage operating system 200 implements a write-anywhere file system of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file-based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow luns and exports to persist over, e.g., reboot operations, while also enabling management of the vdisk as a single disk object in relation to SAN clients. An example of a vdisk and its associated inodes is described in U.S. patent application Ser. No. 10/10/216,453 titled Storage Virtualization by Layering Virtual Disk Objects on a File System, by Vijayan Rajan, et al., the contents of which are hereby incorporated by reference.

B. Storage Operating System

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system architecture that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

The term "storage system" should therefore be taken broadly to include such arrangements in addition to any subsystems configured to perform a storage function and associated with other equipment or systems.

Figure 2:
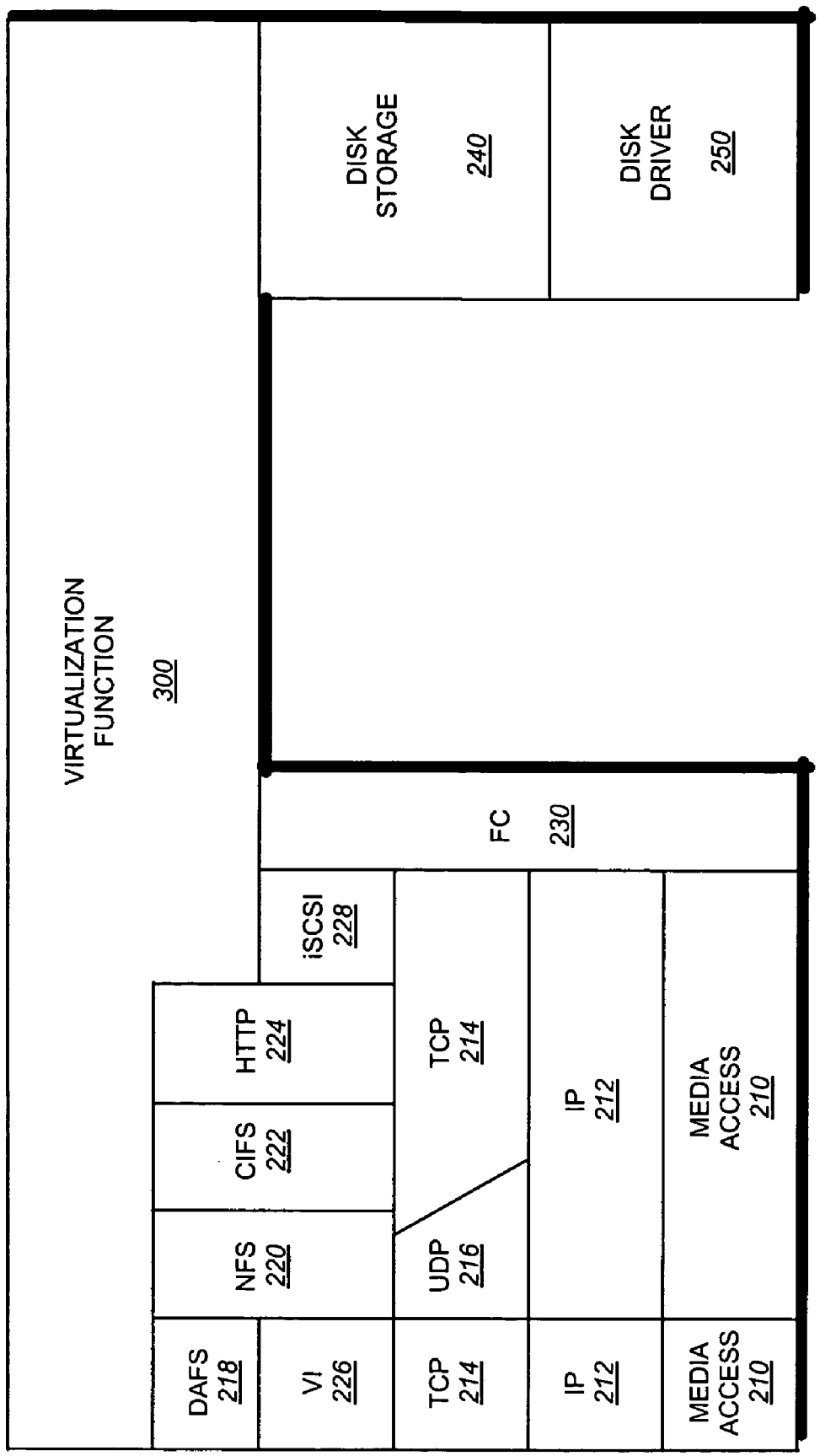
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Figure 3:
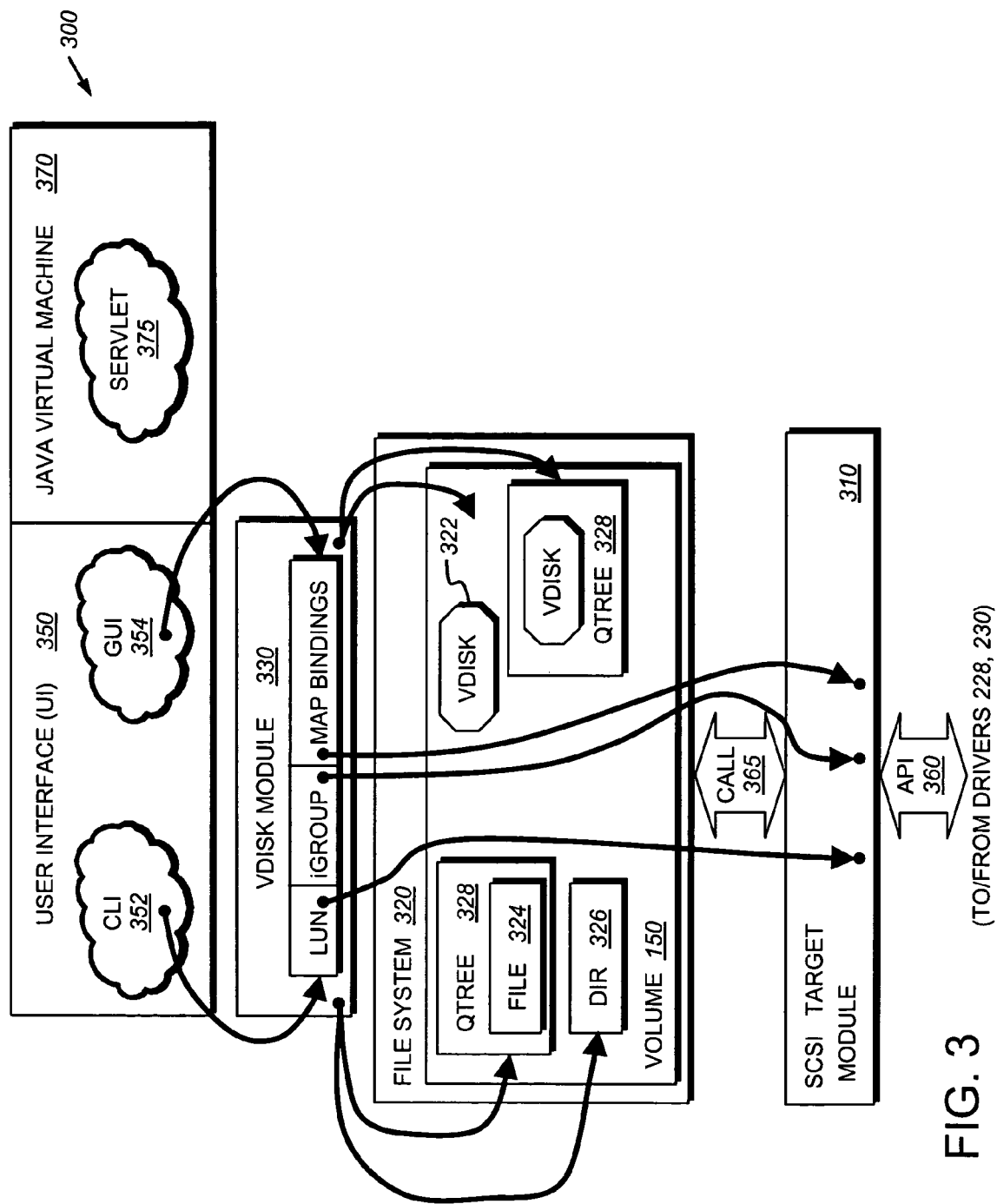
FIG. 3 is a schematic block diagram of a virtualization system in accordance with an embodiment of the present invention.

Bridging the disk software layers with the integrated network protocol stack layers is a virtualization system 300. FIG. 3 is a schematic block diagram of an exemplary virtualization system 300 that is implemented by a file system 320 cooperating with virtualization modules illustratively embodied as, e.g., vdisk module 330 and SCSI target module 310. It should be noted that the vdisk module 330, file system 320 and SCSI target module 310 can be implemented in software, hardware, firmware, or a combination thereof. The vdisk module 330 is layered on (and interacts with) the file system 320 to provide a data path from the block-based SCSI target module to blocks managed by the file system. The vdisk module also enables access by administrative interfaces, such as a streamlined user interface (UI 350), in response to a system administrator issuing commands to the multi-protocol storage appliance 100. In essence, the vdisk module 330 manages SAN deployments by, among other things, implementing a comprehensive set of vdisk (lun) commands issued through the UI 350 by a system administrator. These vdisk commands are converted to primitive file system operations ("primitives") that interact with the file system 320 and the SCSI target module 310 to implement the vdisks.

The SCSI target module 310, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the FC and iSCSI drivers 228, 230 and the file system 320 to thereby provide a translation layer of the virtualization system 300 between the SAN block (lun) space and the file system space, where luns are represented as vdisks.

The file system provides capabilities for use in file-based access to information stored on the storage devices, such as disks. In addition, the file system provides volume management capabilities for use in block-based access to the stored information. That is, in addition to providing file system semantics (such as differentiation of storage into discrete objects and naming of those storage objects), the file system 320 provides functions normally associated with a volume manager.

The file system 320 illustratively implements the WAFL file system having an on-disk format representation that is block-based using, e.g., 4 kilobyte (kB) blocks and using inodes to describe the files. The WAFL file system uses files to store meta-data describing the layout of its file system; these meta-data files include, among others, an inode file. A file handle, i.e., an identifier that includes an inode number, is used to retrieve an inode from disk. A description of the structure of the file system, including the inode file, is provided in U.S. Pat. No. 5,819,292, entitled Method for Maintaining Consistent States of a File System and for Creating User-Accessible Read-Only Copies of a File System by David Hitz et al., issued Oct. 6, 1998, which patent is hereby incorporated by reference as though fully set forth herein.

As noted, the file system 320 organizes information as file, directory and vdisk objects within volumes 150 of disks 130. Underlying each volume 150 is a collection of RAID groups 140-144 that provide protection and reliability against disk failure(s) within the volume. The information serviced by the multi-protocol storage appliance is protected according to an illustrative RAID 4 configuration. This level of protection may be extended to include, e.g., synchronous mirroring on the appliance platform. A vdisk 322 created on a volume that is protected by RAID 4 "inherits" the added protection of synchronous mirroring if that latter protection is specified for the volume 150. In this case, the synchronous mirroring protection is not a property of the vdisk but rather a property of the underlying volume and the reliability guarantees of the file system 320.

Management of the integrated multi-protocol storage appliance 100 is simplified through the use of the UI 350 and the vdisk command set available to the system administrator. The UI 350 illustratively comprises both a command line interface (CLI 352) and a graphical user interface (GUI 354) used to implement the vdisk command set to, among other things, create a vdisk, increase/decrease the size of a vdisk and/or destroy a vdisk. The storage space for the destroyed vdisk may then be reused for, e.g., a NASbased file in accordance with the virtualized storage space feature of the appliance 100. A vdisk may increase ("grow") or decrease ("shrink") under user control while preserving block and NAS multi-protocol access to its application data.

C. Virtual Storage Appliances (Vfilers)

The present invention comprises an architecture that provides the ability to create and maintain multiple instances of block-based virtual servers, such as virtual storage appliances (vfilers), within a single physical server, such as a physical storage appliance platform. A vfiler is a logical partitioning of network and storage resources of the storage appliance platform to establish an instance of a multi-protocol server that is configured to service data access requests in response to block-based protocols, such as iSCSI. Each vfiler is maintained and executed entirely independent of other vfilers on the platform. To that end, dedicated storage appliance resources, such as units of storage and network addresses of network interfaces, may be arbitrarily grouped and "hard" partitioned to establish security domains within the storage appliance. Yet common storage appliance resources, such as a storage operating system and a file system, may be shared among the vfilers.

Specifically, each vfiler is allocated a certain amount or subset of dedicated and distinct units of storage resources, and one or more dedicated and distinct network addresses. Each vfiler is also allowed shared access to the common file system on behalf of its client. Therefore, interpretations of a security object associated with, e.g., a client accessing the common file system may vary among vfilers. To address this, each vfiler is provided a vfiler context data structure (hereinafter "vfiler context") including, among other things, information pertaining to a unique and distinct security domain of the vfiler to thereby enable controlled access to allocated and shared resources of the vfiler.

For example, the vfiler context of a first vfiler ensures that users or clients of a first security domain can use a first set of source and destination network addresses when issuing requests to access a first subset of storage resources on the storage appliance. Similarly, the vfiler context of a second vfiler ensures that clients of a second security domain may use a second set of source and destination network addresses to access a second subset of storage resources. Notably, the clients of each security domain are unaware of each other's "presence" on the storage appliance and, further, are unable to access each other's storage resources. In sum, no data flow exists between vfilers.

Figure 4:
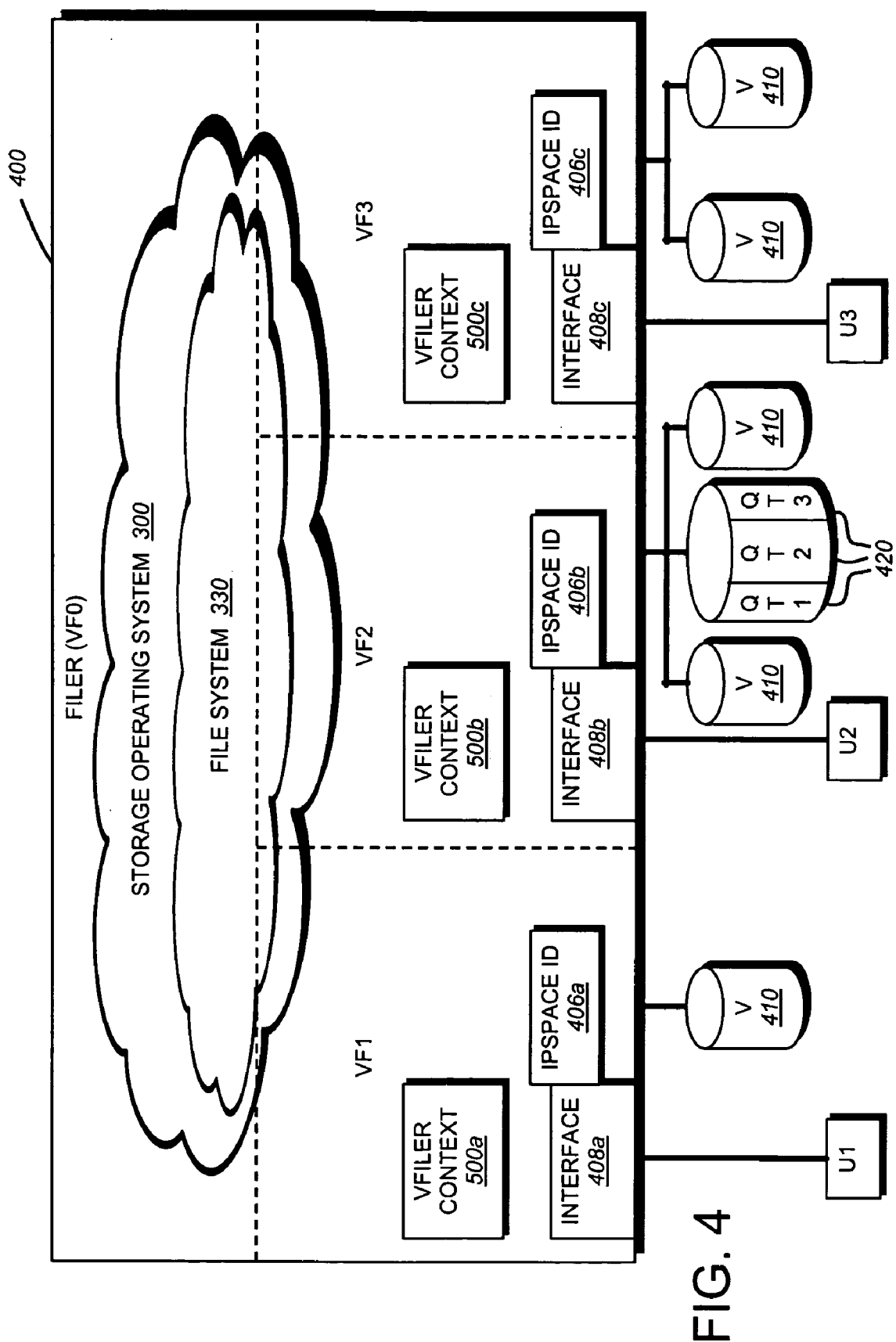
FIG. 4 is a schematic diagram of an embodiment of a storage appliance having a plurality of virtual filers (vfilers) in accordance with the embodiment of the present invention.

FIG. 4 is a schematic diagram of an embodiment of a storage appliance platform 400 having a plurality of vfilers. Each vfiler may be embodied as a server, e.g., a CIFS or iSCSI server, which is referenced by a logical name, e.g., VF1-VF3. From the perspective of a client, each vfiler is separate and distinct from the other vfilers. Each vfiler VF1-VF3 is configured with one or more Internet Protocol (IP) addresses that may be assigned to one or more network interfaces 408a-c. In this context, the term network interface refers to an IP addressable interface, including a "physical" NIC and a "soft" NIC, such as a virtual interface (VIF), a virtual local area network (VLAN) and an emulated LAN (ELAN). Notably, a single NIC can support a plurality of IP addresses and, with such a configuration, multiple vfilers can effectively share a single NIC, if desired.

Each interface of the storage appliance is further assigned an IPspace identifier (ID) 406a-c that essentially "binds" the interface to an IPspace. An IPspace refers to a distinct IP address space in which the storage appliance and its storage operating system participate. A single storage appliance can support multiple IPspaces. Each vfiler is associated with an IP address space and, thus, belongs to one IPspace. The IP addresses within each IPspace must be unique. The IPspace is further described in U.S. Patent Application Ser. No. 10/035,666 entitled, TECHNIQUE FOR ENABLING MULTIPLE VIRTUAL FILERS ON A SINGLE FILER TO PARTICIPATE IN MULTIPLE ADDRESS SPACES WITH OVERLAPPING NETWORK ADDRESSES, by Gaurav Banga, et al.

The units of storage resources allocated to each vfiler include a volume or sub-volume (qtree). A volume (V) 410 is a unit of storage comprising a file system or hierarchy of directories and files. A qtree, QT1-3 420, is a special directory similar to a mini-volume (mini-file system) or subdivision of a volume that has the property of being able to identify itself within a file system by, e.g., a qtree identifier (qtreeid) stored within an inode of a file. The vfiler architecture provides efficient utilization and management of these storage resources, including creation, assignment and mapping of the resources to and among the vfilers. For example, a virtual server (such as vfiler) and its associated storage resources (such as qtrees) may be migrated to a server (such as a storage appliance) and consolidated with other virtual servers (vfilers) having similarly named resources. Since the storage resources are allocated on a per-vfiler basis, such server consolidation and storage migration are transparent to a client because there is no change in the way the client refers to its data.

In the illustrative embodiment, each vfiler may own certain quanta of data, e.g., volumes and qtrees, which the vfiler is permitted to access. In addition, vdisks are not directly owned by a vfiler, but are instead inherit the ownership attributes of the volume or qtree wherein they reside. Thus, if a vfiler can access a given volume or qtree, it can access any vdisks stored within those storage units. This simplifies storage unit ownership and is consistent with exemplary file-based vfilers, such as those described in the above-incorporated U.S. patent application entitled ARCHITECTURE FOR CREATING AND MAINTAINING VIRTUAL FILERS ON A FILER.

According to an aspect of the invention, a vfiler is created by the following CLI command of a the UI 350 (described further below) associated with the storage operating system:

vfiler create [xyz][-s IPspace-name] [-i IP address(s)] [/vol/vol2] [/vol/vol3/qt1]

wherein xyz is the name of the created vfiler, -s IPspace-name is the name of the IPspace to which the vfiler belongs and -i IP address(s) denotes a particular IP address or series of IP addresses of the vfiler. In addition, the notation /vol/vol2 is a first path descriptor to a first unit of storage, whereas the notation /vol/vol3/qt1 is a second path descriptor to a second unit of storage. The default vfiler is vfiler 0 (VF0) that is created at initialization upon booting of the physical storage appliance; VF0 is the only vfiler embodied in the storage appliance if no other vfilers are created. The default VF0 is associated with the physical storage appliance platform to enable access to, e.g., filer resources that are unassigned after all resource assignments have been made for all vfilers on the storage appliance. When no vfilers are defined, VF0 includes all resources of the storage appliance.

Each vfiler maintains certain metadata in the root directory of the storage appliance. The metadata contains the various configuration files for the vfiler. This metadata is also mirrored to a hidden metadata directory in the root directory of the vfiler. Typically, the metadata is mirrored to the /etc directory of the vfiler. However, in alternate embodiments, the metadata may be mirrored to other locations within the vfiler directory is structure. This hidden metadata directory is modified whenever the vfiler metadata is modified. The hidden metadata directory is typically utilized for vfiler migration, described further below.

Figure 5:
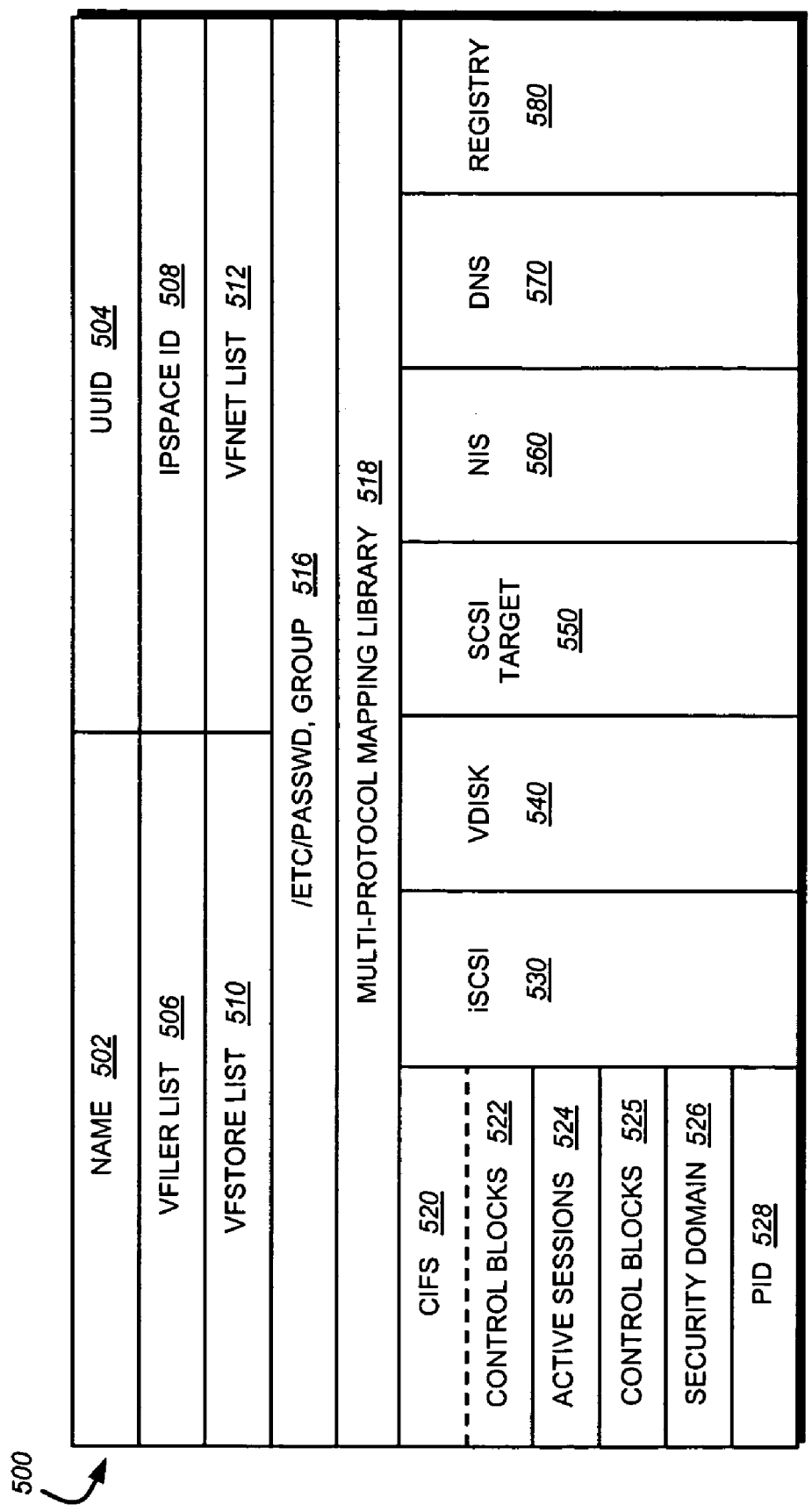
FIG. 5 is a schematic block diagram illustrating a vfiler context data structure in accordance with an embodiment of the present invention.

In particular, the vfiler create CLI command creates a vfiler context 500a-c for each vfiler. Note that a vfiler context is created for VF0 at initialization of the storage appliance. FIG. 5 is a schematic block diagram illustrating an in core representation of a vfiler context 500 containing configuration information or "state" needed to establish an instance of a multi-protocol server. Multiple instances of these contexts provide the basis for the vfiler architecture. The vfiler context 500 includes fields for holding a name 502 of the vfiler and a universally unique identifier (UUID 504) that is created with the vfiler context. The UUID may comprise, e.g., the current time of day and a medium access control (MAC) address associated with the vfiler. A vfiler list field 506 contains a list of vfilers on the storage appliance platform and an IPspace indicator (ID) field 508 holds the IPspace ID of the vfiler.

According to the vfiler architecture, hardware resources, such as storage and network devices, are not directly assigned to the vfilers. Instead, software objects representing (in full generality) only a portion of the capabilities of these hardware devices are assigned to the vfilers. These software ("soft") objects correspond only to a "dynamically adjustable" portion of a hardware resource. The advantage of using soft objects for assignment to a vfiler is total flexibility in allocating, adding, moving and removing complete or portions of hardware resources between vfilers on a physical filer. These operations can be accomplished very quickly using, e.g., a simple short-running console command as opposed to a complex, long-running procedure of re-configuring or copying hardware objects between hardware partitioning based virtual servers, such as a VM or data mover.

Figure 6:
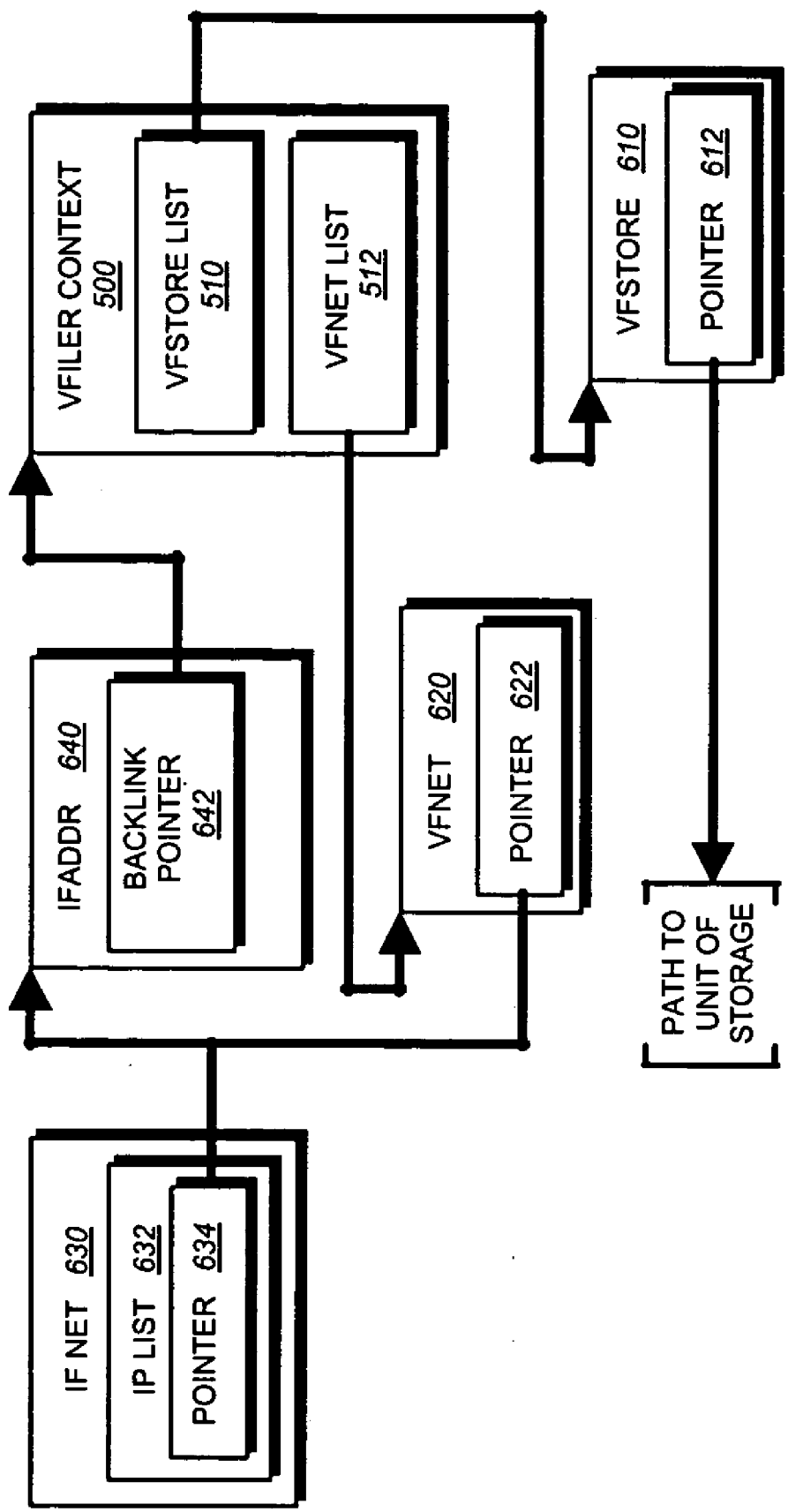
FIG. 6 is a schematic block diagram of an ifnet data structure in accordance with an embodiment of the present invention.

Therefore, other fields of the vfiler context structure 500 hold a list 510 of virtual filer storage (vfstore) structures (soft objects) and a list 512 of virtual filer network (vfnet) soft objects. FIG. 6 is a schematic block diagram illustrating soft object data structures that may be advantageously used with the present invention. In particular, the vfstore list 510 comprises pointers to vfstore soft objects 610, each of which has a pointer 612 that references a path to a unit of storage resource, such as a qtree or volume, allocated to the vfiler. This allows, e.g., a volume consisting of multiple qtrees to be effectively shared between vfilers. A hash table (not shown) is also provided that "maps" each qtree or volume back to a vfiler context 500 (and thus a vfstore 610).

The vfnet list 512 comprises pointers to vfnet soft objects 620, each of which has a pointer 622 that references an interface address (ifaddr) data structure 640 representing an IP address assigned to the vfiler. Each vfnet object 620 represents a "floating" capability that may be assigned to any network interface, e.g., a NIC, when an IP address is assigned to that NIC. If multiple IP addresses are assigned to the NIC, the capabilities of the NIC are effectively shared between multiple vfnet objects 620 and, thus, potentially different vfilers. If only a single IP address is associated with an interface (as represented by an interface network (ifnet) data structure 630), only one vfnet object 620, and therefore only one vfiler, uses the capabilities of the NIC.

Resource mapping is defined as the mapping between soft objects that represent assigned resources of a vfiler (e.g., vfstore and vfnet objects) to portions of hardware resources, such as a qtree/volume and an vfnet structure. The vfstore and vfnet soft objects thus provide a level of indirection that represents the dynamically adjustable portions of capabilities of these hardware resources. That is, these soft objects are "linked" to other software objects (data structures) representative of the hardware resources in a manner that enables flexibility when "logically" reassigning those network and storage resources by, e.g., changing pointers of the objects. Such flexibility allows logical establishment of vfiler configuration changes at the file system level, as opposed to physical establishment by, e.g., manually rearranging the network and storage hardware resources.

For example, an ifnet structure 630 includes an IP list field 632 that contains a list of IP addresses assigned to a network interface. The list 632, in turn, includes pointers 634 that reference appropriate ifaddr data structures 640 associated with those IP addresses. As noted, each vfnet object 620 may contain a pointer 622 to an ifaddr structure 640 (if the corresponding IP address is configured on an ifnet structure 630) or may contain a null value (if the address is not configured). Each ifaddr structure 640 also contains a back link pointer 642 to the vfiler context 500 (and therefore to a corresponding vfnet object 620).

Similarly, each vfstore object 610 has a pointer 612 to a path of a unit of storage, if the storage resource is online. In the illustrative embodiment, the WAFL file system 330 maintains information relating to the availability and scope of units of storage, such as qtrees and volumes. System calls are provided to query the file system with a path and, in response, receive a storage identifier tuple (e.g., fsid, qtreeid) that indicates the volume and qtree to which the path belongs.

Resource mapping in the vfiler architecture further enables efficient network and storage management with respect to, e.g., migration (assignment) of network and storage resources among vfilers. Network management refers to the set of data structures and algorithms that maintain the resource mapping between vfilers and their network resources as dynamic changes are made to the assignment of these resources and other changes on the filer platform. Storage management, on the other hand, refers to the set of data structures and algorithms that maintain the resource mapping between vfilers and their storage resources as dynamic changes are made to the assignment of these resources and other changes on the platform. Assignment changes include the addition, movement and removal of resources between vfilers. Other system changes include the creation of new NICs (VIFs and VLANs, or new devices) or the addition/on-lining/off-lining of storage volumes.

Network and storage management also includes the tasks performed on networking and storage objects when changes are made to the assignments of resources between vfilers. For example, TCP/IP connections and routing associated with an IP address must be reinitialized when the vfiler assignment of an IP address changes. Similarly, disk input/output operations that are in progress on a qtree or volume must be aborted, and quotas must be reinitialized when the vfiler assignment of a storage unit changes.

Each vfiler context 500 further includes a plurality of "module" data structures that includes all information (such as global variables) needed for an instance of a particular protocol or subsystem. For example, a CIFS module data structure 520 contains all information needed for an instance of the CIFS protocol, including information about contacting a domain controller 522, active sessions 524 for the protocol and various control blocks 525 associated with the CIFS protocol. The domain controller is a network server that accepts logon requests and initiates their authentication. Information pertaining to a security domain 526 is also provided to enable NT-type security for a CIFS request. The security information includes a security identifier comprising a domain portion and a relative ID (RID) portion, the latter RID being similar to the user ID of UNIX security. In the case of Windows domain security, the security information also includes a trust relationship with the domain controller. The trust relationship signifies the ability of a vfiler to "trust" the domain controller to authenticate a user on behalf of the vfiler. Each CIFS module 520 also contains a process ID (PID 528) of the CIFS authentication process that enables the CIFS layer to send an authentication request to the correct CIFS authentication process.

There is a similar "per-module" data structure for each of the protocols and sub-systems associated with a vfiler including, but not limited to, the iSCSI protocol 530, a vdisk data structure 540, a SCSI target 550, NIS subsystem 560, domain name service (DNS) subsystem 570 and registry 580. The NIS subsystem or "yellow pages" is a service locator for the NFS protocol that is implemented as a distributed database storing security information, such user and group IDs associated with each user password. The vdisk data structure contains pointers to various in-core data structures utilized by the vfiler for managing vdisks associated with the vfiler. The SCSI target data structure 550 is utilized by the vfiler for storing various per vfiler data, such as the identify of initiators that have logged into the vfiler and the current state of the various adapters.

C. Initiator Groups

SAN clients typically identify and address disks by logical numbers or luns.

However, the UI 350 interacts with the vdisk module 330 and SCSI target module 310 to map logical names to vdisks. An igroup is a logical named entity that is assigned to one or more addresses, e.g., WWN or iSCSI IDs, associated with one or more initiators (depending upon whether a clustered environment is configured). Igroups are further defined in U.S. patent application Ser. No. 10/421,576, entitled CONSISTENT LOGICAL NAMING OF INITIATOR GROUPS, by Mohan Srinivasan, et al. The storage appliance manages export control of vdisks by logical names through the use of igroups. When an igroup is created, the addresses are essentially "bound" (associated) to a logical name or igroup.

In the illustrative embodiment, vdisks (luns) are "layered" on top of igroups. The igroup abstracts the underlying details of "naming" (i.e., identification) of clients or initiators that desire access to the vdisks. The naming details (for purposes of allowing access to a vdisk/lun by a client/initiator) may be completely different between block access protocols, such as FCP and iSCSI. However, the logical naming of igroups is consistent with the FC and SCSI standards; the user interface system, described herein, represents an application of those standards that simplifies access to the vdisks. The igroup abstraction thus decouples implementation of addressing from the underlying details of addressing. In other words, an igroup allows a user to define client or related clients addressing by logical names that are then used by higher layer vdisk (lun) commands to allow access. As a result, a vdisk (lun) can be easily shared over iSCSI and FCP, thereby allowing use in applications such as a mixed iSCSI or FCP cluster. Moreover, reorganization or upgrades of client/initiators do not affect security assignments (allowing access) at the lun level, since they are indirect via the logical igroup name.

Figure 7:
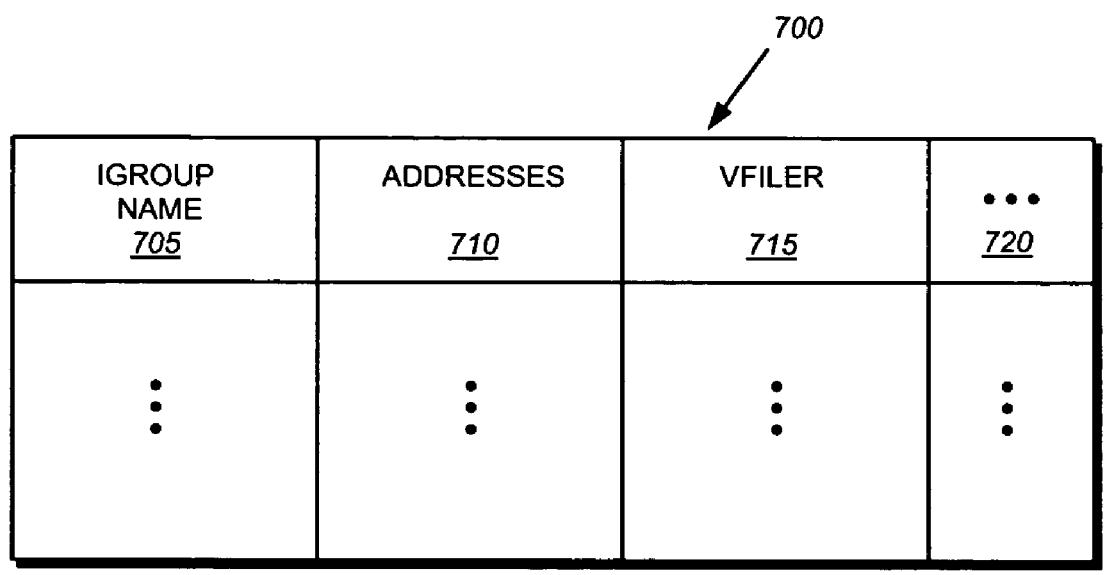
FIG. 7 is a schematic block diagram of an exemplary initiator group data structure in accordance with an embodiment of the present invention.

FIG. 7 is a schematic representation of an igroup data structure 700 according to an embodiment of the present invention. The igroup data structure 700 includes an igroup name field 705, an addresses field 710, a vfiler field 715 and, in alternate embodiments, additional field 720. The object name field 705 identifies the logical name associated with the igroup. The addresses field 710 contains one or more addresses, e.g., WWN addresses or iSCSI ids that identify the clients comprising the igroup. The vfiler field 715 identifies which vfiler is associated with a particular igroup. According to an aspect of the invention, each igroup is associated with a vfiler which enables per vfiler management of luns and igroups as well as per-vfiler management of client access to vdisks associated with a particular vfiler. Additionally, modifications to an igroup must be performed within the context of the appropriate vfiler. Thus, for example the addition of initiators to the addresses field 710 of an igroup must be performed within the context of the vfiler identified in the vfiler field 715 of that igroup.

The UI system includes a method of assigning a lun ID to a vdisk and specifying the igroup of initiators that are allowed access to the vdisk, i.e., the clients to which the vdisk is exported. Each igroup has certain associated attributes, such as transport protocol type and operating system type of its member initiators (node names). For example, the initiators within an igroup illustratively support the FCP and iSCSI transport protocol type. The operating system type attribute refers to the operating system type of the member initiators in the igroup. This latter attribute is provided because a SCSI target (such as the multiprotocol storage appliance) often "behaves" differently when interacting with different operating systems (e.g., Solaris, Windows, and Linux) of the initiators. Processing of a request received at the storage appliance occurs at lower layers of the storage operating system. Since addresses (WWN or iSCSI IDs) are bound to igroup name, these lower layers "know" whether the request is received over, e.g., an iSCSI or FCP transport.

The igroup need not be homogeneous in terms of these attributes, i.e., an igroup can contain initiators having different combinations of FCP and iSCSI as a transport. For example, iSCSI and FCP initiators may be combined into a single igroup. In addition, an igroup can support various operating system initiator members. This allows operations, such as graceful rolling upgrade of a FC SAN cluster to an iSCSI cluster, with no application downtime. In addition, membership of the igroups can be modified at any time, i.e., initiators can be added to or removed from an igroup and, as a consequence, inherit or lose the mappings of the igroup, respectively.

D. User Interface of Vfilers

Management of the storage appliance 100 is simplified through the use of the UI 350 and the igroup and lun command set available to the system administrator. As noted, the UI 350 illustratively comprises both a command line interface (CLI 352) and a graphical user interface (GUI 354) used to implement a vdisk command set to, among other things, create a vdisk, increase/decrease the size of a vdisk and/or destroy a vdisk. Commands entered via the UI, whether via the CLI or GUI, are converted using conventional user interface techniques into a set of file system primitives to implement the desired vdisk and/or igroup changes.

The user interface for a vfiler incorporates the same commands as typically utilized on a physical storage appliance. Such commands are further described in U.S. Patent application Ser. No. 10/638,567, entitled USER INTERFACE SYS- TEM FOR A MULTI-PROTOCOL STORAGE APPLIANCE, by Brian Pawlowski, et al. In accordance with the present invention, block-based commands supported by the UI only operate within the particular vfiler context in which they are executed.

Command Line Interface

The UI 350 simplifies the management of storage appliance by, e.g., obviating the need for system administrators to explicitly configure and specify the disks, extants and/or blocks to be used when creating a vdisk. To accomplish such simplified management, the illustrative UI provides a number of CLI commands, including an igroup command and a lun command. The igroup command includes a variety of options described further below, for creating, destroying, and managing the igroups associated with a given storage system. Similarly, the lun command, along with a variety of options, permits a system administrator to create, destroy, and/or manage luns associated with the storage system.

In accordance with another aspect of the present invention, all CLI commands associated with lun or block-based management on a vfiler execute within a particular vfiler context. Thus, changes made by a command are vfiler specific and do not affect global physical storage appliance operations. It should be noted that while this description is written in terms of exemplary lun and igroup commands, the principles of the present invention are applicable to any command within the UI for managing luns or other block based operations.

An example of the igroup command is:

igroup create -f/i <groupname> <nodename(s)> wherein the <groupname> parameter indicates the name of the igroup and the <nodename(s)> parameter indicates the initiators, e.g., the WWN or iSCSI address IDs to be bound to the igroup. The f/i options determine whether the nodenames to be listed are FCP WWNs (the -f option) or iSCSI addresses (the -i option). The create option creates a new igroup by essentially binding the WWN addresses or iSCSI IDs to a logical name or igroup. The igroup command and the creation of the appropriate igroup data structures file system primitive operations are further described in U.S. patent application Ser. No. 10/421,576, entitled CONSISTENT LOGICAL NAMING OF INITIATOR GROUPS, by Mohan Srinivasan, et al., the contents of which are hereby incorporated by reference.

In alternate embodiments, various other options may be implemented with the igroup command, including, e.g., a destroy option to delete an igroup. When a user enters (activates) an igroup destroy command at the CLI 352, the storage operating system removes the appropriate igroup data structures and stream fields and "unbinds" the WWN address or iSCSI IDs from the logical name. Another option is an igroup show command that displays all igroups and their associated network addresses.

An igroup may contain one initiator in the case of a simple initiator-to-initiator group binding (or more initiators in the case of SAN cluster or a single client with multiple initiators for redundancy and/or multipathing purposes). The created igroup thus enables groupings of initiators by human-friendly logical name.

An example of a lun command is:

lun create -s<size><pathname> wherein, the create option specifies creation of a lun (vdisk), the -s option specifies a size of the vdisk to be created and the <pathname> parameter is a qualified path to the created vdisk. In the exemplary embodiment, a size may be denoted using a variety of suffixes to the numerical identifier including, for example b (bytes), k (kilobytes), m (megabytes), g (gigabytes) or t (terabytes). As will be noted by one skilled in the art, various other sizing identifiers may be utilized in accordance with the teachings of the present invention.

The result of the lun create command is the creation of a vdisk having the specified size and that is RAID protected without having to explicitly specify such protection. Storage of information on disks of the multi-protocol storage appliance is not typed; only "raw" bits are stored on the disks. The file system organizes those bits into vdisks and RAID groups across all of the disks within a volume. Thus, the created vdisk does not have to be explicitly configured because the virtualization system 300 creates a vdisk in a manner that is transparent to the user. The created vdisk inherits high-performance characteristics, such as reliability and storage bandwidth, of the underlying volume created by the file system. The vdisk to be created must be located on a storage unit, such as a volume or qtree, owned by the vfiler in whose context the lun create command is executed. When the vdisk is created, the vfiler entry 840 (see FIG. 8) of a lun data structure is set to identify the vfiler that "owns" the vdisk.

As noted above, the multi-protocol storage appliance manages export control of vdisks by logical names through the use of initiator groups (igroups). A lun map command may be used to export one or more vdisks to the igroup, i.e., to make the vdisk(s) "visible" to the igroup. An example of an illustrative lun map command is:

lun map <path name><igroup> wherein the <path name> parameter is the path name to the lun to be mapped and the <igroup> parameter identifies an initiator group that should be mapped to the desired lun. In this sense, the lun map command is equivalent to an NFS export or a CIFS share, i.e., the WWN addresses or iSCSI IDs identify the clients that are allowed to access the vdisk identified by the pathname. Thereafter, the logical name igroup is used with all operations internal to the storage operating system. This logical naming abstraction is pervasive throughout the entire lun and igroup command sets, including interactions between a user and the multi-protocol storage appliance. In particular, the igroup naming convention is used for all subsequent export operations and listings of luns that are exported for various SAN clients. This mapping is effective for the vfiler context in which the command is executed.

To undo a mapping, the storage operating system provides a lun unmap command that disassociates an igroup from a lun. An example of a lun unmap command is:

lun unmap <path name> <igroup> wherein the <path name> parameter identifies the path name to the lun to be unmapped and the <igroup> parameter identifies the igroup that is to be disassociated with the lun. After execution of a lun unmap command, the lun will not be visible to initiators within the igroup.

A lun may be dynamically resized by the administrator using a lun resize command. An example of an illustrative lun resize command is:

lun resize <path name> <size> wherein the <path name> parameter is the path name of the lun to be resized and the <size> parameter identifies the new size of the lun. In the exemplary embodiment, a size may be denoted using a variety of suffixes to the numerical identifier including, for example b (bytes), k (kilobytes), m (megabytes), g (gigabytes) or t (terabytes). In the illustrative embodiment, the lun resize command changes the size of the lun that is reported by the storage appliance to clients. Host applications, executing on the clients, then manage the size change once the storage appliance has reported the change.

A lun may also be deleted (destroyed) by an administrator through the use of a lun destroy command. A lun destoy command deletes the underlying file embodying the lun from the file system. An exemplary lun destroy command is:

lun destroy <path name> wherein the <path name> parameter identifies the path name of the lun to be deleted (destroyed). Upon execution of the lun destroy command, the storage operating system removes the vdisk from the file system.

To briefly summarize the operation of the CLI, the igroup and lun commands are provided to enable a user/system administrator to create, delete and maintain igroups and luns. An administrator first generates an igroup, which is a mapping of one or more initiator WWNs or iSCSI IDs to a logical human-friendly name. A user may then create a lun or vdisk through the use of the lun create command. The administrator, using the lun map command, then maps the created lun to the igroup so initiators within the igroup may access the lun. Once the lun has been created, an administrator may utilize the lun resize command to grow or shrink the size of the lun to meet changing system needs. If an igroup no longer requires access to a lun, the igroup may be disassociated with the lun through the use of the lun unmap command. Finally, if a lun is no longer needed, it may be deleted through the use of the lun destroy command.

Graphical User Interface

The GUI 354 may be implemented on the multi-protocol storage appliance to allow an user or administrator easy access to the management functionality contained in the vdisk/igroup command set. The GUI portion of the Ul is modified to incorporate appropriate block-based compatibility. By providing a GUI, in addition to the CLI commands, the multi-protocol storage appliance may be initialized with fewer references to manuals and/or other aids for the administrator. Additionally, the GUI may provide additional graphical and/or tabled reporting data that is not available via CLI. Such consolidated reporting is further described in U.S. patent application Ser. No. 09/862,949, entitled SYSTEM AND METHOD FOR CONSOLIDATED REPORTING OF CHARACTERISTICS FOR A GROUP OF FILE SYSTEMS by Brian M. Hackworth.

The GUI provides an alternative to the CLI for executing lun management commands. Additionally, the GUI may be easier to use for inexperienced system administrators and may enable faster initialization of luns by removing the need to reference manuals for specific commands. The GUI may be implemented in a variety of environments including, for example, a Microsoft Windows environment, a X-Window based workstation environment, or other graphical user interface system environment. Alternatively, the GUI may be accessed through a browser via the World Wide Web.

In one embodiment, the GUI converts a series of menu options or other graphical interactions into a CLI command which is then executed using, for example, remote shell (RSH) technology. In other embodiments, the GUI includes appropriate conventional program code to directly generate file system primitives for performing requested actions. For example, a Java Virtual Machine (JVM) 370 (shown in FIG. 3) may include a number of servlets 375 that interface with the GUI 354 of the UI 350. The servlet 375 may implement the various user interface functionality described below by, for example, generating HTML pages "on-the-fly" for display at a remote location via the World Wide Web. The servlet may communicate directly with the HTTP layer 224 of the storage operating system to send HTML requests and receive user selections. In alternate embodiments, the creation of GUI web-based pages may be accomplished using other techniques of dynamic remote graphical user interface techniques including, for example, dynamic HTML (DHTML), Flash technology or the like. In the illustrative embodiment, however, the GUI provides a series of "wizards" that "walks" a user through the creation of or performance of certain tasks.

E. Vfiler Operation

According to the invention, received data access operations are processed within the appropriate vfiler context. The storage operating system determines this context by, for example, analyzing the received network address to which the command is directed. The storage operating system further ensures that only those initiators associated with an igroup that is permitted to access a given lun may modify the lun. A lun data structure is utilized by the storage operating system to track lun metadata during operations, including the vfiler that "owns" the lun.

An exemplary lun data structure 800 is shown in FIG. 8. The lun data structure 800 includes a volume name field 805, a path name field 810, a volume number 815 and appliance name field 820, an appliance number field 825, a PCPI number 830, a field of WWNS to be exported to 835, a vfiler field 840, and in alternate embodiment, additional fields 845. It should be noted that the fields described herein are exemplary only in that additional and/or differing fields may be utilized in accordance with the various embodiments of the invention. The volume name field 805 identifies the volume containing the vdisk. The path name field 810 describes a path on the volume identified in the volume name field 805 to the file containing the vdisk. The list of WWNs to be exported to field 835 contains a list of WWNs of clients of to which lun is to be exported and which may access the given lun. The vfiler field 840 identifies which vfiler this lun is associated with. In accordance with the illustrative embodiment, each lun is associated with a particular vfiler. Operations directed to a lun/vdisk must be performed within the vfiler's context. Lun data objects are further described in U.S. patent application Ser. No. 10/619,122, entitled SYSTEM AND METHOD FOR OPTIMIZED LUN MASKING, by Herman Lee et al.

Figure 9:
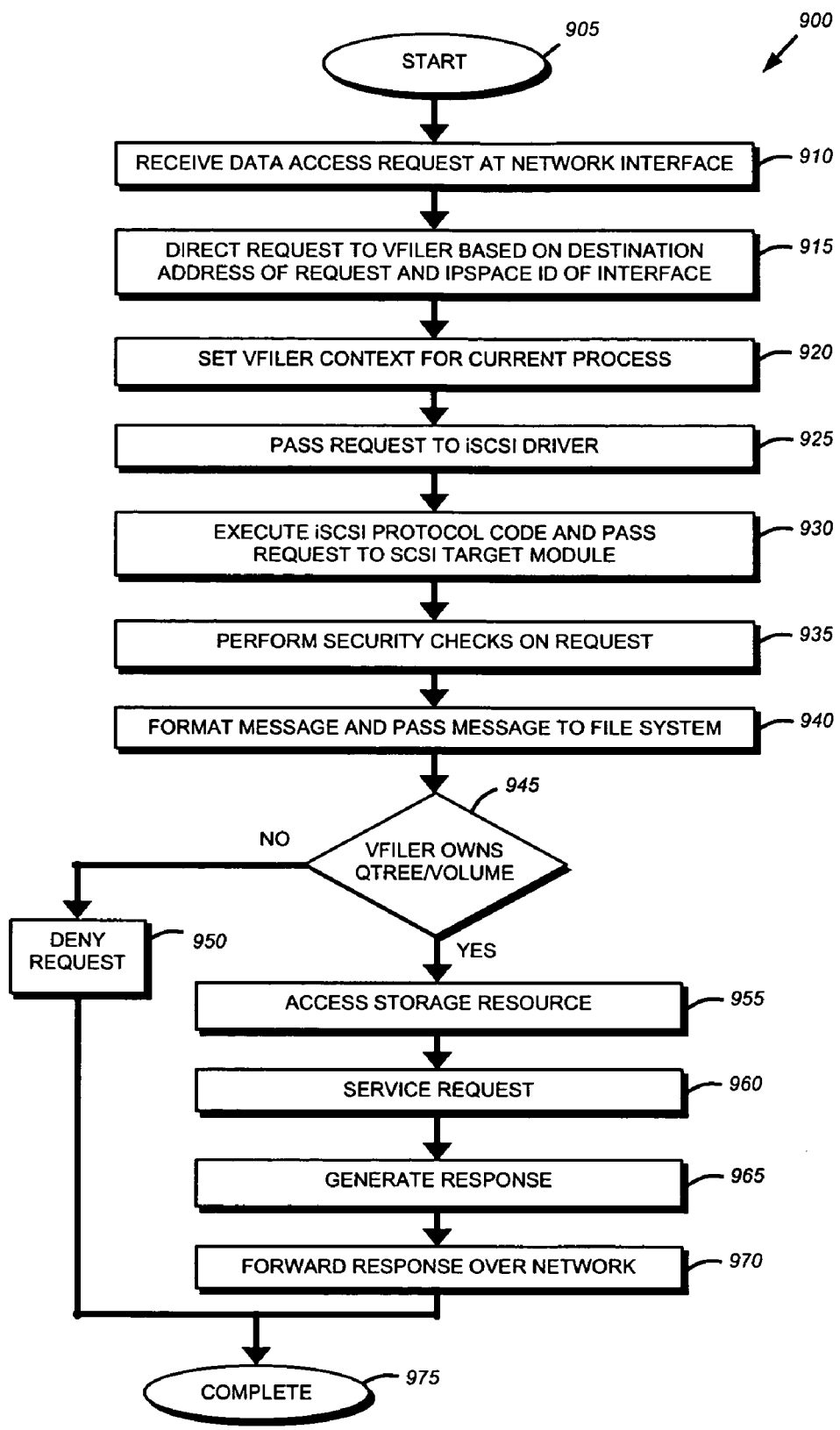
FIG. 9 is a flowchart detailing the steps of a procedure for processing data access requests on a vfiler in accordance with an embodiment of the present invention.

In accordance with the illustrative embodiment, clients of a vfiler may access a vdisk exported by the vfiler using block-based protocols, such as iSCSI. FIG. 9 is a flowchart detailing the steps of a procedure 900 performed by the vfiler in processing data access requests directed to it by a client in accordance with the embodiment of the present invention. The procedure 900 begins in step 905 and continues to step 910 where an incoming request is received at a network interface of a storage appliance. This network interface may be , for example, a conventional Ethernet NIC. Then, in step 915 the request is directed to the proper vfiler based on a destination address of the request and the IPspace ID of the interface. For example, assume a driver of the media access layer receives an iSCSI request to access a particular vdisk. As noted, the network interface is associated with a specific IPspace. The network driver passes a request to the IP layer, where the destination IP address of the request and the IPspace ID are compared with configuration information stored in an IP database to select the vfiler context that owns the request. As a result, a specific vfiler context is associated with the request. Selection of a vfiler context for processing an incoming request is described more fully in U.S. Patent application Ser. No. 10/035,666, entitled TECHNIQUE FOR ENABLING MUTIPLE VIRTUAL FILERS ON A SINGLE FILER TO PARTICIPATE IN MULTIPLE ADDRESS SPACES WITH OVERLAPPING NETWORK ADDRESS, by Gaurav Banga, et al. The vfiler context is then set for the current process in step 920. This vfiler context is utilized by the storage operating system for limiting access to only data associated with the vfiler context.

In step 925, the received request is passed to the iSCSI driver of the storage operating system for execution. The iSCSI driver then executes the appropriate iSCSI protocol code (step 930) and passes the resulting request to the SCSI target module of the storage operating system. The SCSI target module, in step 935, performs appropriate security checks on the request. These security checks may include, in the illustrative embodiment, ensuring that the vdisk is properly mapped to the initiator sending the data access requests. Once the appropriate security checks have been performed, the SCSI target module, in step 940, converts the received data access request into appropriate file system primitives and passes the resulting messages to the file system for processing.

Then, in step 945, the file system determines if the vfiler owns the qtree or volume containing the vdisk. If the vfiler does not own the appropriate data container, e.g., qtree or volume, the procedure branches to step 950, where the request is denied before completing in step 975. However, if the vfiler owns the qtree or volume, the procedure continues to step 955 where the storage resource is accessed by the file system. The received request is then serviced in step 960 and a response is generated in step 965. This may be, in the case of a read request, obtaining the data from the appropriate blocks of the vdisk and generating a response. The response is then forwarded over the network to the originating client in step 970 before the procedure completes in step 975.

To again summarize, a request is received at the network interface of a physical storage appliance and a determination is made of a particular vfiler to which the request is directed. The vfiler context is then set and the request is passed through the various layers of the storage operating system for processing. Appropriate security checks are performed to ensure that the vfiler context that has been set has the appropriate permissions to execute the desired functions, including a check of ownership of the underlying data container, e.g., a volume or qtree, of a vdisk. The command is then processed and a response generated to be transferred back to the originating client.

An additional operational feature of vfilers is that they may be migrated from one physical storage appliance to another physical storage appliance. This may be accomplished for a variety of reasons including, for example load balancing of processing request across physical storage appliances. Alternately, vfilers may be migrated for disaster recovery purposes wherein a destination vfiler is established but not activated until such time as a disaster recovery situation occurs, for example, when the physical storage appliance executing one of the vfilers fails.

Figure 10:
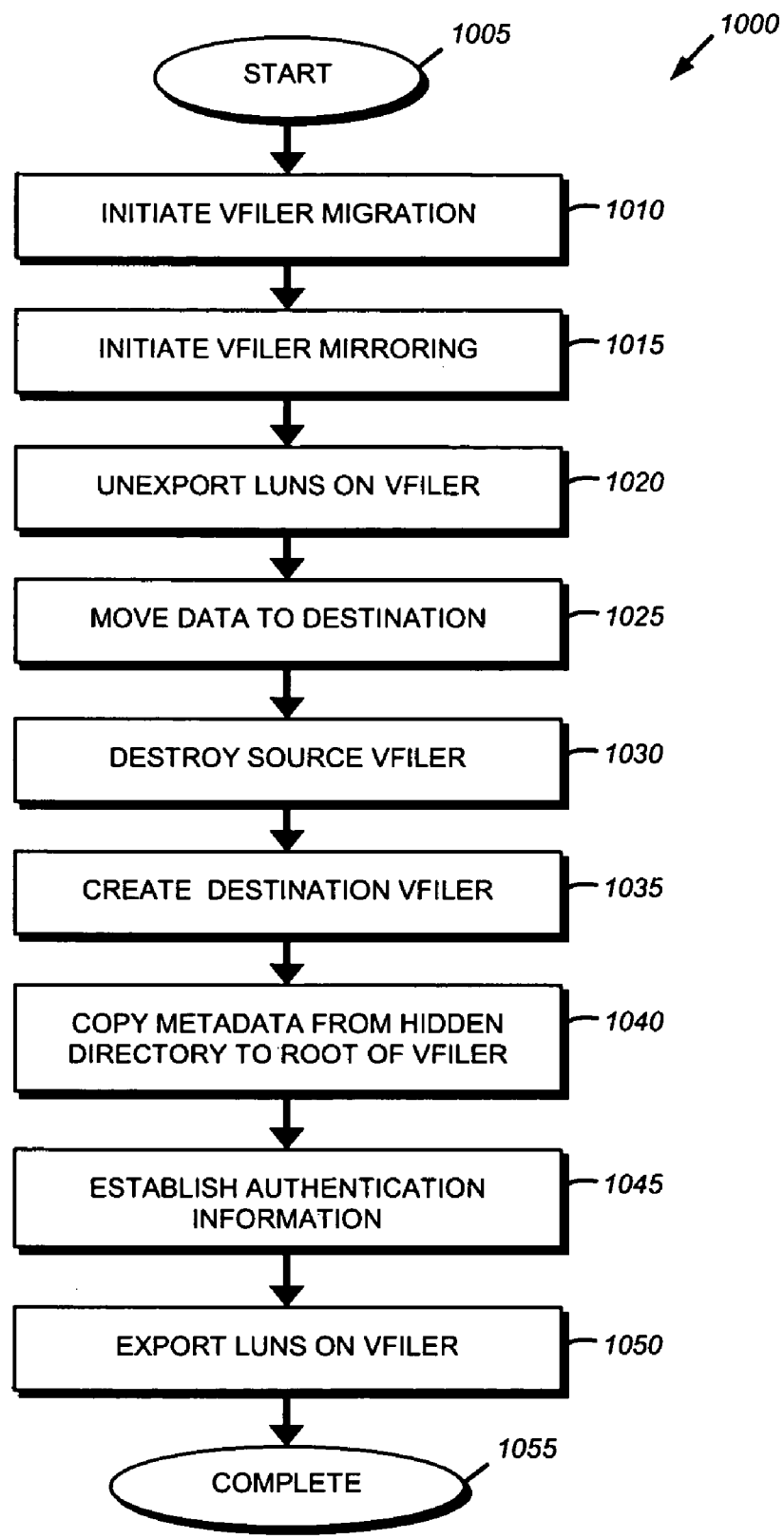
FIG. 10 is a flowchart detailing the steps of a procedure for migrating a vfiler in accordance with an embodiment of the present invention.

FIG. 10 shows the steps of a procedure 1000 for performing vfiler migration in accordance with an embodiment of the present invention. The procedure 1000 begins in step 1005 and continues to step 1010 where the vfiler migration is initiated by, e.g., a CLI command executed on the physical storage appliance of the source vfiler. Then, in step 1015, vfiler mirroring is initated. Mirroring, which causes all luns associated with a source vfiler to be mirrored to a physical storage appliance may be performed by a variety of techniques. One such technique is described in U.S. Patent Application Serial No. 10/100,967 entitled SYSTEM AND METHOD FOR DETERMINING CHANGES IN TWO SNAPSHOTS AND FOR TRANSMITTING CHANGES TO A DESTINGATION SNAPSHOT, by Michael L. Federwisch, et al., the contents of which are hereby incorporated by reference. All luns associated with the vfiler are all unexported in step 1020. Next, in step 1025, any additional data is moved to the destination. Such additional data may comprise the completion of a mirroring process to bring the destination nearer to a point where it is consistent with the source mirror. Once the data has been moved to the destination, then, in step 1030, the source vfiler is destroyed and a destination vfiler is created on the destination storage appliance (step 1035).

Then in step 1040, metadata from a hidden directory within each vfiler is copied to the root of the storage appliance. As noted above, a shadow copy of certain metatata is created in the root directory of each vfiler. The shadow copies are hidden files that are written anytime the real metadata files are written. As they are stored in a directory "underneath" (within) each vfiler, these hidden files are migrated as part of the mirroring operation. Thus, in step 1040, the hidden metadata files are copied from a hidden directory to the appropriate location within the storage appliance's root volume. Once the metadata has been copied, the administrator establishes appropriate authentication in step 1045. As the authentication database is typically stored in the root volume of the physical appliance and is not user accessible, it cannot be mirrored or accessed by the vfiler. As such, it typically needs to be recreated by the administrator. This step of recreating authentication information is required if, for example, the administrator has implemented certain types of authentication, such a CHAP. In these configurations, the CHAP data-base must be recreated. However, in other embodiments, this authentication recreation step is not necessary.

It should be noted that in one embodiment of vfiler migration, an administrator executes a vfiler migrate command that performs all necessary migration operations including, for example, the mirroring of data. In an alternate embodiment, an administrator may first issue a vfiler migrate start command that initiates the mirroring operation, but does not perform the remaining migration steps until the execution of a vfiler migrate complete command. Then, in step 1050, the luns are exported from the newly created vfiler. The process then completes in step 1055.

To again summarize, the present invention is directed to a system and method or architecture for creating and maintaining block-based protocols on a virtual storage appliance executing in a physical storage appliance. This differs from known vfiler implementations, such as that described in the above-incorporated U.S. patent application entitled ARCHITECTURE FOR CREATING AND MAINTAINING VIRTUAL FILERS ON A FILER, which are limited to processing only file-level protocols. Vfilers according to the present invention are multi-protocol and may process both block-based and file-based protocols. It should be noted that while this description has been written in terms of iSCSI, the principles of the present invention are applicable to any block-based protocols, such as SCSI encapsulated in FC (FCP). For a FCP implementation, HBAs that support multiple Ids will be required to perform appropriate partitioning of the networking resources among the vfilers on the physical storage system. Block-based commands associated with a CLI of a UI are modified so that they become vfiler context aware and operate within the context of a particular vfiler.

The foregoing description has been directed to specific embodiments of this invention. It will be apparent, however, that other variations and modifications may be made to the described embodiments, with the attainment of some or all of their advantages. Specifically, it should be noted that any number of NIC/HBAs may be utilized in accordance with the invention. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A system comprising:
   a processor;
   a memory coupled to the processor;
   a storage operating system resident in the memory and executed by the processor, the storage operating system implementing a file system configured to provide storage service of information stored on the system;
   a plurality of network interfaces configured to process received block-based protocol data access requests, each network interface assigned to one or more network addresses, each network interface further assigned an identifier that binds the network interface to an address space that includes the one or more network addresses; and
   a plurality of context data structures stored in the memory and containing configuration information to establish a plurality of instances of virtual servers executed by the processor, each virtual server allocated resources that include a partitioning of the network interfaces and assigned network addresses to establish a distinct security domain for that virtual server that enables controlled access to the allocated network interfaces and assigned network addresses, each virtual server further configured to share access to the file system to service the block-based protocol data access requests by converting the block-based protocol data access requests to appropriate file system data requests when providing the storage service of the information stored on the system.

2. The system of claim 1 further comprising storage media configured to store information as units of storage resources, the units of storage resources allocated among each of the virtual servers.

3. The system of claim 2 wherein the units of storage resources comprise volumes.

4. The system of claim 2 wherein the units of storage resources comprise qtrees.

5. The system of claim 2 wherein the file system is configured to perform a boundary check to verify that a request is allowed to access certain units of the storage resources on the storage media, each virtual server further configured to create virtual disks within the units of storage resources and wherein each of the virtual disks is associated with one or more of the virtual servers.

6. The system of claim 5 wherein the storage operating system further comprises a user interface having a command set configured to operate on the virtual disks, and wherein the command set executes within a context of a virtual server.

7. The system of claim 6 wherein the user interfaces comprises a command line interface (CLI) configured to support the command set.

8. The system of claim 7 wherein the CLI comprises a lun command configured to perform operations to a virtual disk associated with the context of the virtual server.

9. The system of claim 8 wherein the lun command creates a logical unit number on the file system, the logical unit number being associated with the context of the virtual server.

10. The system of claim 7 wherein the CLI comprises an igroup command that generates a set of file system primitives for binding an initiator group to one or more initiator addresses and wherein the initiator group is associated with the context of the virtual server.

11. The system of claim 1 wherein the block-based protocol comprises Internet Small Computer System Interface (iSCSI).

12. The system of claim 1 wherein the block-based protocol comprises Fibre Channel Protocol (FCP).

13. The system of claim 1 wherein the system is further configured to process data access requests in response to one or more file-level protocols.

14. A method comprising:
    executing, by a processor, a storage operating system resident in a memory of a storage system, the storage operating system implementing a file system configured to provide storage service of information stored on the storage system;
    processing, by the processor coupled to a plurality of network interfaces, received block-based protocol data access requests;
    assigning each network interface to one or more network addresses;
    assigning each network interface an identifier that binds that network interface to an address space that includes the one or more network addresses;
    storing a plurality of context data structures in the memory, where each context data structure contains configuration information to establish a plurality of instances of virtual servers executed by the processor;
    allocating resources that include a partitioning of the network interfaces and assigned network addresses to each virtual server to establish a distinct security domain for that virtual server that enables controlled access to the allocated network interfaces and assigned network addresses; and
    sharing, amongst the virtual servers, access to the file system to service the block-based protocol data access requests by converting the block-based protocol data access requests to appropriate file system data requests when providing the storage service of the information stored on the storage system.

15. The method of claim 14 further comprising configuring storage media to store information as units of storage resources, the units of storage resources allocated among each of the virtual servers.

16. The method of claim 15 wherein the units of storage resources comprise volumes.

17. The method of claim 15 wherein the units of storage resources comprises qtrees.

18. A non-transitory computer readable medium containing executable program instructions executed by a processor, comprising:
    program instructions that execute a storage operating system resident in a memory of a storage system, the storage operating system implementing a file system configured to provide storage service of information stored on the storage system;
    program instructions that process block-based protocol data access requests received at a plurality of network interfaces;
    program instructions that assign each network interface to one or more network addresses;
    program instructions that assign each network interface an identifier that binds that network interface to an address space that includes the one or more network addresses;
    program instructions that store a plurality of context data structures in the memory, where each context data structure contains configuration information to establish a plurality of instances of virtual servers executed by the processor;
    program instructions that allocate resources that include a partitioning of the network interfaces and assigned network addresses to each virtual server to establish a distinct security domain for that virtual server that enables controlled access to the allocated network interfaces and assigned network addresses; and program instructions that share, amongst the virtual servers, access to the file system to service the block-based protocol data access requests by converting the block-based protocol data access requests to appropriate file system data requests when providing the storage service of the information stored on the storage system.

* * * * *

UNITED STATES PATENT AND TRADEMARK OFFICE
CERTIFICATE OF CORRECTION

PATENT NO. : 8,230,085 B2  
APPLICATION NO. : 10/822431  
DATED : July 24, 2012  
INVENTOR(S) : Guillermo Roa It is certified that error appears in the above-identified patent and that said Letters Patent is hereby corrected as shown below:

Col. 10, line 50 should read: "by the following CLI command of a the UI 350 (described"

Col. 11, line 11 should read: "directory is structure. This hidden metadata directory is modi-"

Col. 12, line 7 should read: "such as a qtree/volume and an vfnetifnet structure. The vfstore and"

Col. 13 line 32 should read: "storing various per vfiler data, such as the identifyidentity of initiators"

Col. 15 line 4 should read: "UIU1 only operate within the particular vfiler context in which"

Col. 16 line 67 should read: "through the use of a *lun destroy* command. A *lun destoydestroy*"

Col. 17 line 28 should read: "vdisk/igroup command set. The GUI portion of the U1UI is"

Col. 19 line 56 should read: "vfiler mirroring is initatedinitiated. Mirroring, which causes all luns"

Col. 20 line 9 should read: "noted above, a shadow copy of certain metatatametadata is created in"

Signed and Sealed this  
Fourth Day of December, 2012

David J. Kappos  
*Director of the United States Patent and Trademark Office*